(12) United States Patent
Muren et al.

(10) Patent No.: US 10,519,773 B2
(45) Date of Patent: Dec. 31, 2019

(54) QUICK RELEASE ROTOR ATTACHMENT SYSTEMS AND METHODS

(71) Applicant: FLIR Unmanned Aerial Systems AS, Hvalstad (NO)

(72) Inventors: Petter Muren, Nesbru (NO); Pal Hagh Sandberg, Hvalstad (NO); Christian Moengen, Hvalstad (NO); Jo Eyvin Bjaarstad, Hvalstad (NO)

(73) Assignee: FLIR Unmanned Aerial Systems AS, Hvalstad (NO)

( * ) Notice: Subject to any disclaimer, the term of this patent is extended or adjusted under 35 U.S.C. 154(b) by 382 days.

(21) Appl. No.: 15/909,644

(22) Filed: Mar. 1, 2018

(65) Prior Publication Data

US 2018/0266251 A1    Sep. 20, 2018

(30) Foreign Application Priority Data

Mar. 14, 2017  (NO) .................................. 20170379

(51) Int. Cl.
  *F01D 5/02* (2006.01)
  *B64C 11/04* (2006.01)
  (Continued)

(52) U.S. Cl.
  CPC .............. *F01D 5/025* (2013.01); *B64C 11/02* (2013.01); *B64C 11/04* (2013.01); *B64C 11/08* (2013.01);
  (Continued)

(58) Field of Classification Search
  CPC ........... F01D 5/025; B63H 1/20; B64C 11/02; B64C 11/04; B64C 11/08; B64C 11/10; B64C 11/14; F16C 33/4652; F24S 2025/6004; Y10T 403/60; Y10T 403/602; Y10T 403/7075; F16B 7/042
  See application file for complete search history.

(56) References Cited

U.S. PATENT DOCUMENTS 4,364,368 A * 12/1982 Blanchette ............. F02M 26/58
                                                        123/568.29
4,568,216 A *  2/1986 Mizusawa ........... F16C 11/0657
                                                        403/122
(Continued)

FOREIGN PATENT DOCUMENTS

AU           529220         6/1983
CN        101653661         2/2010
(Continued)

*Primary Examiner* — Nathaniel E Wiehe
*Assistant Examiner* — Michael K. Reitz
(74) *Attorney, Agent, or Firm* — Haynes and Boone, LLP

(57) ABSTRACT

Provided herein is a rotor attachment assembly for an aircraft. A rotor attachment assembly includes a connecting assembly associated with the aircraft and a rotor assembly configured to be connected to the connecting assembly. The rotor assembly includes a plurality of fins configured to fit a respective plurality of cut-outs of the connecting assembly, a hollow section configured to accommodate at least a part of a pin of the connecting assembly so as to center the rotor assembly relative to the connecting assembly, and a spring configured to expand to allow the fins to pass and to close to retain the fins when the rotor assembly is connected to the connecting assembly.

20 Claims, 3 Drawing Sheets

(51) Int. Cl.
    *B64C 11/02*   (2006.01)
    *B64C 11/10*   (2006.01)
    *B64C 11/08*   (2006.01)
    *F16B 7/04*    (2006.01)
    *B64C 39/02*   (2006.01)

(52) U.S. Cl.
    CPC .............. *B64C 11/10* (2013.01); *F16B 7/042* (2013.01); *B64C 39/024* (2013.01); *F05D 2230/60* (2013.01); *F05D 2230/70* (2013.01); *F05D 2260/52* (2013.01); *F05D 2300/603* (2013.01); *Y10T 403/602* (2015.01)

(56) References Cited

U.S. PATENT DOCUMENTS

| | | | |
|---|---|---|---|
| 6,692,233 B2 * | 2/2004 | Liang | F04D 25/088 |
| | | | 403/325 |
| 8,430,709 B1 | 4/2013 | Wong | |
| 9,079,115 B2 * | 7/2015 | Huang | A63H 27/02 |

FOREIGN PATENT DOCUMENTS

| | | |
|---|---|---|
| CN | 203832751 | 9/2014 |
| CN | 105173072 | 12/2015 |
| WO | WO 2010/114387 | 10/2010 |
| WO | WO 2011/009702 | 1/2011 |
| WO | WO 2016/074133 | 5/2016 |
| WO | WO 2017/028501 | 2/2017 |
| WO | WO 2017/028503 | 2/2017 |

* cited by examiner

Figure 1a
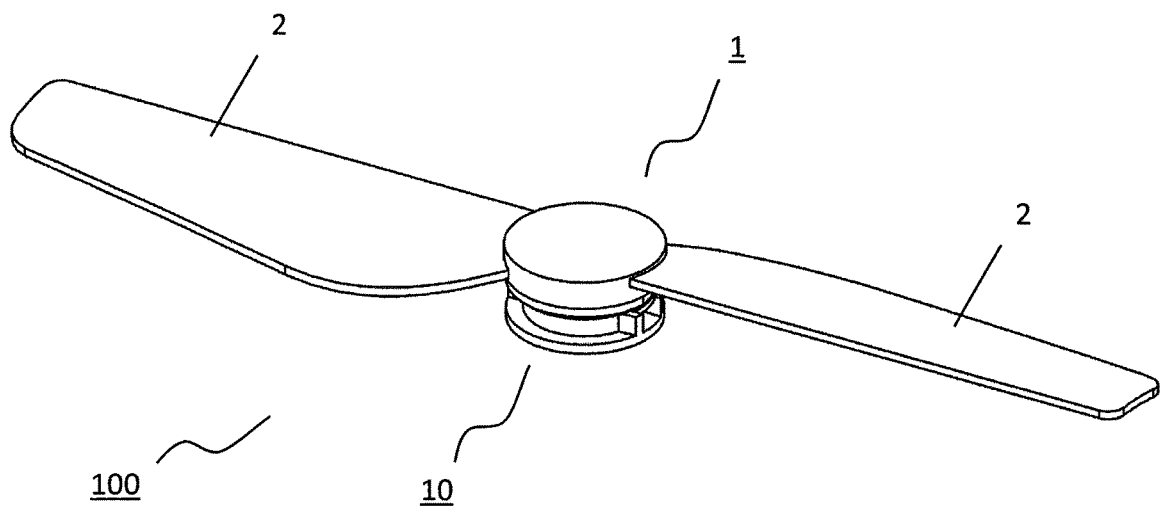
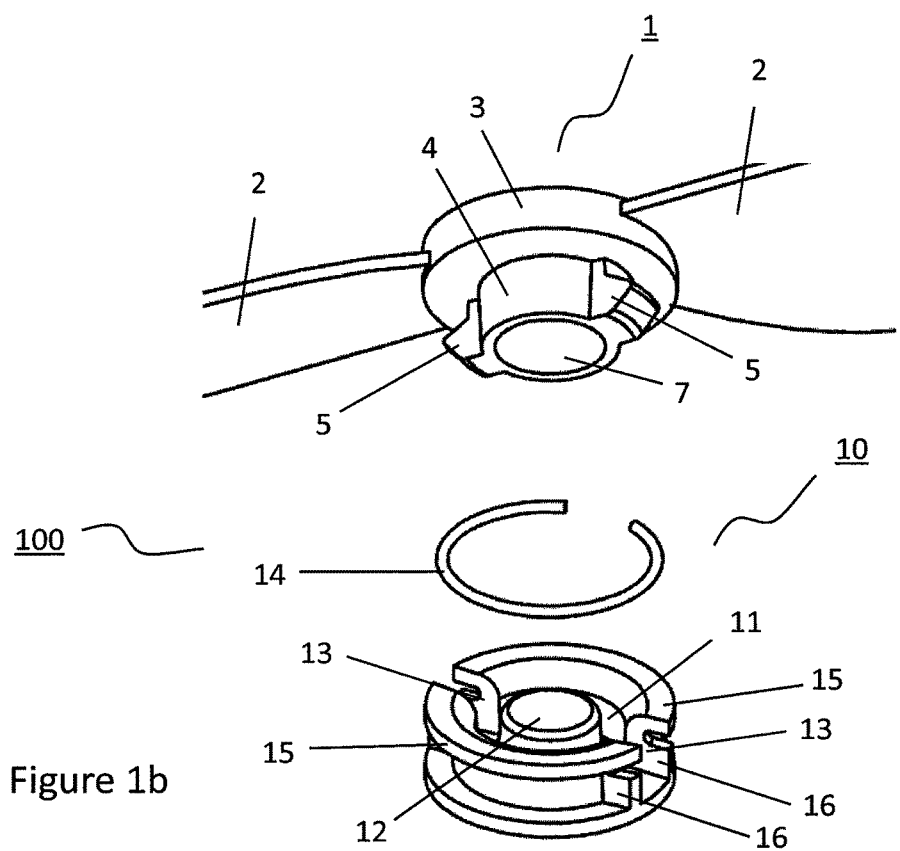
Figure 1b

Figure 2a
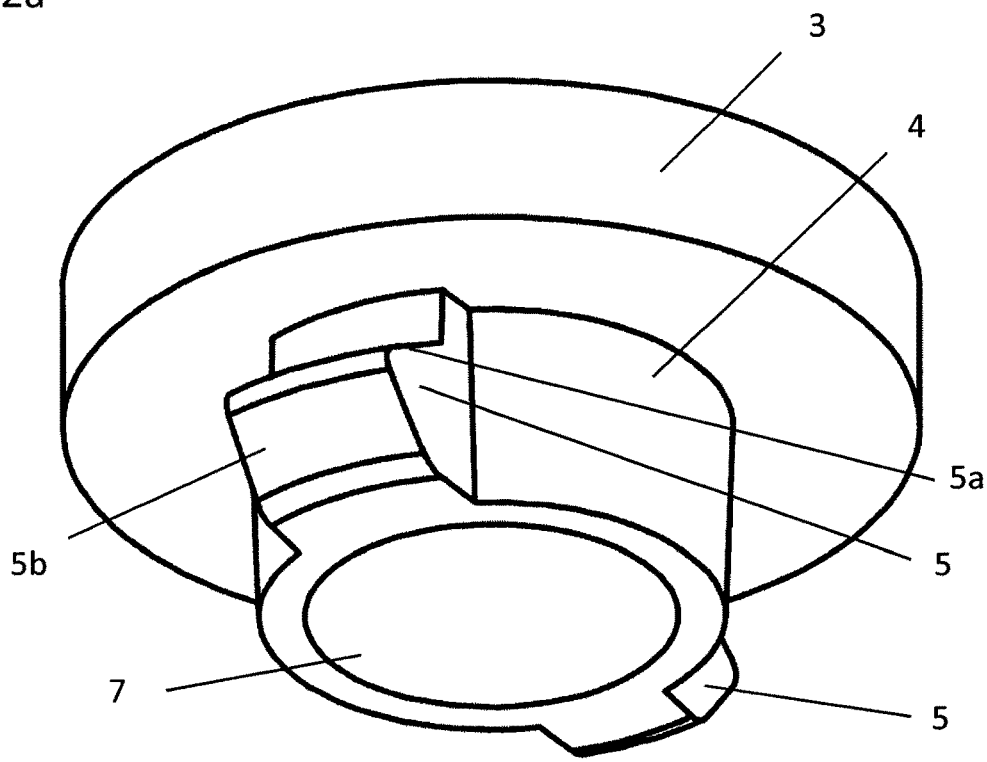
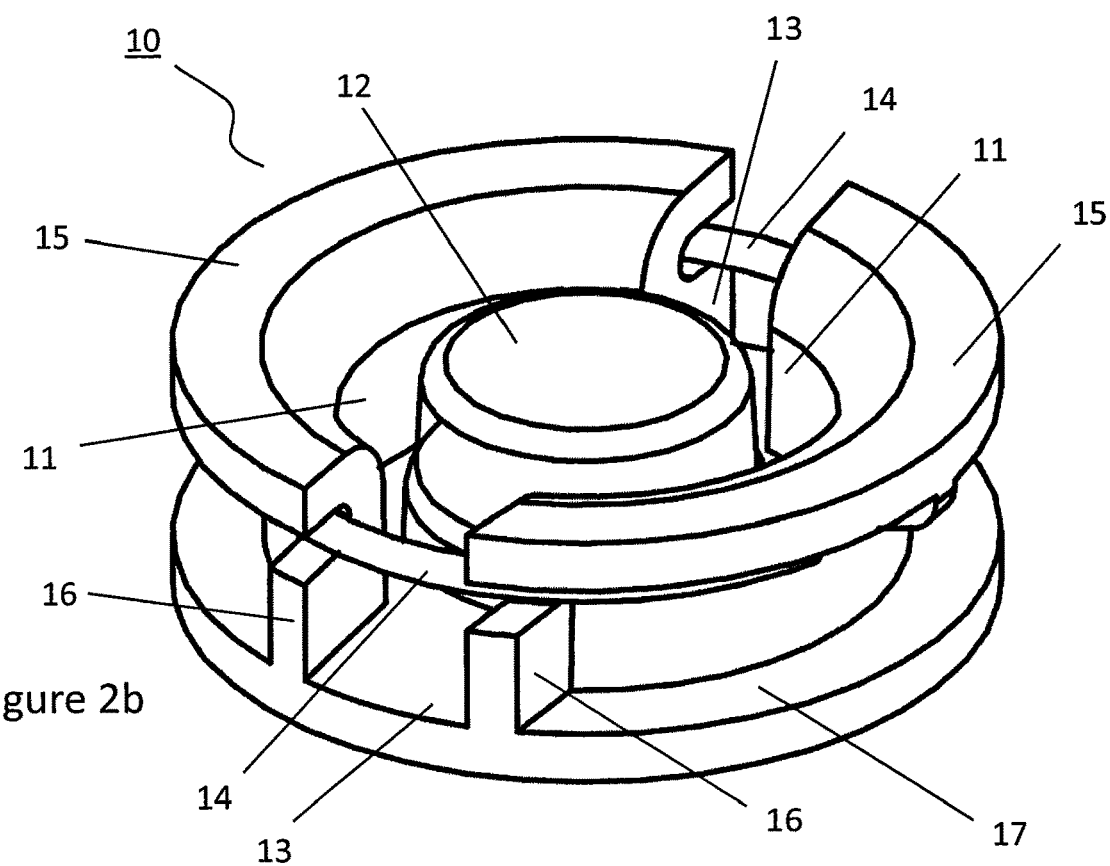
Figure 2b

QUICK RELEASE ROTOR ATTACHMENT SYSTEMS AND METHODS

CROSS-REFERENCE TO RELATED APPLICATIONS

This application claims the benefit of and priority to Norwegian Patent Application No. 20170379 filed Mar. 14, 2017 and entitled "QUICK RELEASE ROTOR ATTACHMENT," which is incorporated herein by reference in its entirety.

TECHNICAL FIELD

One or more embodiments disclosed herein present a rotor attachment assembly providing for convenient connection and removal of a rotor assembly from an associated aircraft. Further, embodiments allow for the rotor assembly to become automatically disconnected from the aircraft if associated rotor blades hit an obstacle.

BACKGROUND

Rotor assemblies comprising two or more rotor blades may be found in a wide range of rotary or fixed wing aircrafts vehicles, including UAVs, that may employ one or more rotor assemblies. Rotary wing aircrafts, such as helicopter or quadcopters, are sustained by rotors rotating about a vertical axis, generating lift or upward thrust. Fixed wing aircrafts, on the other hand, utilize horizontally oriented rotor assemblies to generate forward thrust.

Traditionally, the rotors used in these aircrafts have been simple plastic parts, and the rotors are fixed to the rotor shaft with a screw or nut arrangement. For example, the rotor shaft may comprise threads, and a hole in the center of the rotor is positioned on the shaft and attached by a nut fixing it in place. However, due to maintenance, to optimize performance or to alter the characteristics of the rotor, it is often necessary to change to a new rotor. Which, with a screw mounted rotor would take an unnecessary long time. The fixed connection could also mean that the rotor may damage other parts of the aircraft if it is to come in contact with something. If the aircraft experience a more severe crash, the fixed connection may have the consequence that the rotor blades and several of the connecting parts are damaged and must be replaced. In addition, the rotors of modern aircrafts, as e.g. UAVs, may comprise complicated parts and designs, making it undesirable and costly to simply replace the rotor at each contact with an object.

A slight improvement is provided by rotors were the rotor blades can swing back and forth about a single mounting screw positioned in the inner part of the blades, close to the rotor shaft. If the blades hit an object while the rotor spins this can help reduce the damage to the blades and to the rest of the aircraft. However, even if the blades are free to swing in one plane they are often damaged by the slightest contact with an obstacle. Usually also affecting the hub and the rotor shaft.

WO2010114387 presents a future improvement where a rotor assembly may be attached using magnets, positioning and retaining the rotor assembly during use. However, the solution is complex, and the magnets should be large to account for all forces experienced during flight. Using large magnets may then affect the onboard sensors used for navigation in a modern-day aircraft as well as attracting magnetic particles. This again complicates maintenance and could imply misalignment and a lower performance of the rotor if not regularly maintained.

Therefore, there is a need for a system that allows for an easy positioning and replacement of a rotor assembly, still addressing the requirements of modern day aircrafts and UAVs. Such a system could also disconnect the rotor from the aircraft in the event of a crash, avoiding time consuming and expensive repairs. Further, the system could even be used to remove the rotor from the aircraft for storage and allow for easier transportation of an aircraft.

BRIEF SUMMARY

One or more of the embodiments described herein are directed to overcoming or at least alleviating the above-mentioned disadvantages. This and other aspects are achieved by the embodiments described at least by the claims enclosed herein.

In one embodiment, a rotor attachment assembly for an aircraft includes a connecting assembly associated with the aircraft and a rotor assembly configured to be connected thereto. The rotor assembly may include a plurality of fins configured to fit a respective plurality of cut-outs of the connecting assembly, a hollow section configured to accommodate at least a part of a pin of the connecting assembly so as to center the rotor assembly relative to the connecting assembly 12, and a spring configured to retain the fins when the rotor assembly is connected to the connecting assembly (e.g., to expand to allow the fins to pass into or out of the cut-outs and to close to retain the fins in the cut-outs when the rotor assembly is connected to the connecting assembly). In one embodiment, a lower section of the pin has a larger cross section than an upper section of the pin.

In some embodiments, the widths of the plurality of fins are different to one another and correspond to the width of the respective cut-outs. In some embodiments, the plurality of fins comprises two fins. In one embodiment, an upper edge of the plurality of fins is provided with a first angle within the range of 20-70 degrees relative to a rotor shaft axis of the aircraft, and/or a lower edge of the plurality of fins is provided with a second angle within the range of 15-65 degrees relative to the rotor shaft axis. In another embodiment, the upper edge of the plurality of fins is provided with a first angle within the range of 50-70 degrees relative to the rotor shaft axis, and a lower edge of the plurality of fins is provided with a second angle within the range of 30-50 degrees relative to the rotor shaft axis.

In some embodiments, the spring is made of metal. In some embodiments, the rotor assembly is made of a polymer or composite material. In some embodiments, the connecting assembly is made of a polymer or composite material.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1a illustrates a rotor attachment assembly 100 where a rotor assembly 1 is connected to an opposing connecting assembly 10 according to the presented embodiment. An associated aircraft then being ready for operation.

FIG. 1b illustrates an exploded view of the rotor attachment assembly 100, with the two assemblies, the rotor assembly 1 and the connecting assembly 10, and the spring 14 of the present embodiment.

FIG. 2a illustrates the rotor assembly 1 according to a present embodiment.

FIG. 2b illustrates the connecting assembly 10 according to a present embodiment.

Embodiments of the present invention and their advantages are best understood by referring to the detailed description that follows. It should be appreciated that like reference numerals are used to identify like elements illustrated in one or more of the figures.

DETAILED DESCRIPTION

Figure 3A:
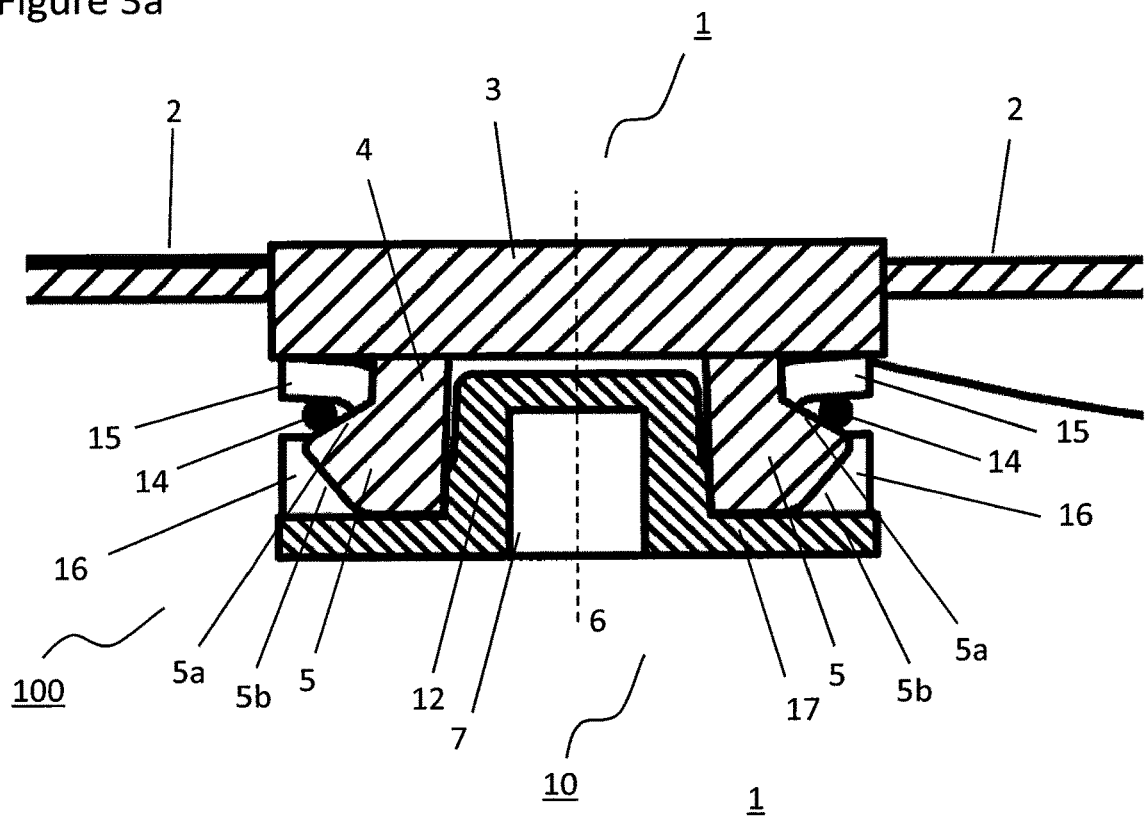
FIG. 3a illustrates the rotor attachment assembly 100 in cross-section view, with the rotor assembly 1 connected to the opposing connecting assembly 10, according to the presented embodiment.

Embodiments described herein disclose a system and a method for providing a convenient connection and removal of a rotor assembly from an associated aircraft. Further, the system of the presented embodiment allows for the rotor assembly to become automatically disconnected from the aircraft if the rotor blades hit an obstacle. In the following, the various embodiments will be described by referring to the accompanying figures.

FIG. 1a illustrates the rotor attachment assembly 100 with a rotor assembly 1 connected to the opposing connecting assembly 10. The connecting assembly 10 is associated with and/or configured to couple to an aircraft, such as an unmanned aerial vehicle. The rotor attachment assembly 100 may alternatively be oppositely oriented, such that parts of the invention here referred to as part of the connecting assembly 10 are associated with the rotor, and that the parts of the invention here referred to as part of the rotor assembly 1 are associated with the aircraft. FIG. 1b illustrates an exploded view of the rotor attachment assembly 100 with the two sub-assemblies of the presented embodiment; the rotor assembly 1 and the connecting assembly 10.

As may be seen in FIGS. 1a-3b, the rotor assembly 1 may include two generally horizontally mounted and oppositely pointing rotor blades 2 having a predetermined airfoil, set at a predetermined nominal blade pitch angle and configured to rotate about a rotor shaft axis 6. Alternatively, the rotor assembly 1 may include more than two, e.g. three, four or even more, rotor blades 2. Regardless, the inner end of each rotor blade 2 is connected to a central part 3 of the rotor assembly 1. The embodiments of central parts 3 in the accompanying figures are only shown as illustrated examples and may, instead of being a simple static design, comprise a number of additional parts and arrangements; such as mechanisms for providing altered blade pitch angle of the rotor blades 2 or other capabilities to the rotor assembly 1. Thereby, the central part 3 may for example comprise links or linkages and be part of a swash plate system, or comprise a torque controlled cyclic pitch system, for example, without affecting the presented embodiment. In various embodiments, the rotor assembly 1 may include a connecting part 4 configured to connect or couple the rotor assembly 1 to the connecting assembly 10.

As shown in FIG. 2a, the connecting part 4 may include a plurality of protruding fins 5 extending out from a center section of the connecting part 4. In the presented embodiment, the center section is provided with a circular form. However, any form may be used, provided that the necessary adjustment or accommodation is made to the connecting assembly 10. The connecting part 4 may comprise or be made out of a suitable metal, composite materials, and/or polymers as e.g. injection-molded plastic. As shown in FIG. 2a, the center of the connecting part 4 may be hollow. The hollow section 7 may include a predefined form or profile matching the form or shape of the pin 12 of the connecting assembly 10, as described herein. As illustrated by the embodiments shown in FIGS. 2a-3b, connecting part 4 may include two fins 5 positioned opposite each other under each respective rotor blade 2. Alternatively, there may be more than two fins 5, e.g. three or four, distributed around the connecting part 4. If there are more than two fins 5 and more than two rotor blades 2, the fins are preferably, but not necessarily, positioned under each rotor blade 2. Alternatively, the number of fins 5 matches the number of rotor blades 2. The fins 5 may further be designed to be of identical size; however, the fins 5 may preferably comprise different widths to aid in connection of the rotor assembly 1, as described herein.

Figure 3B:
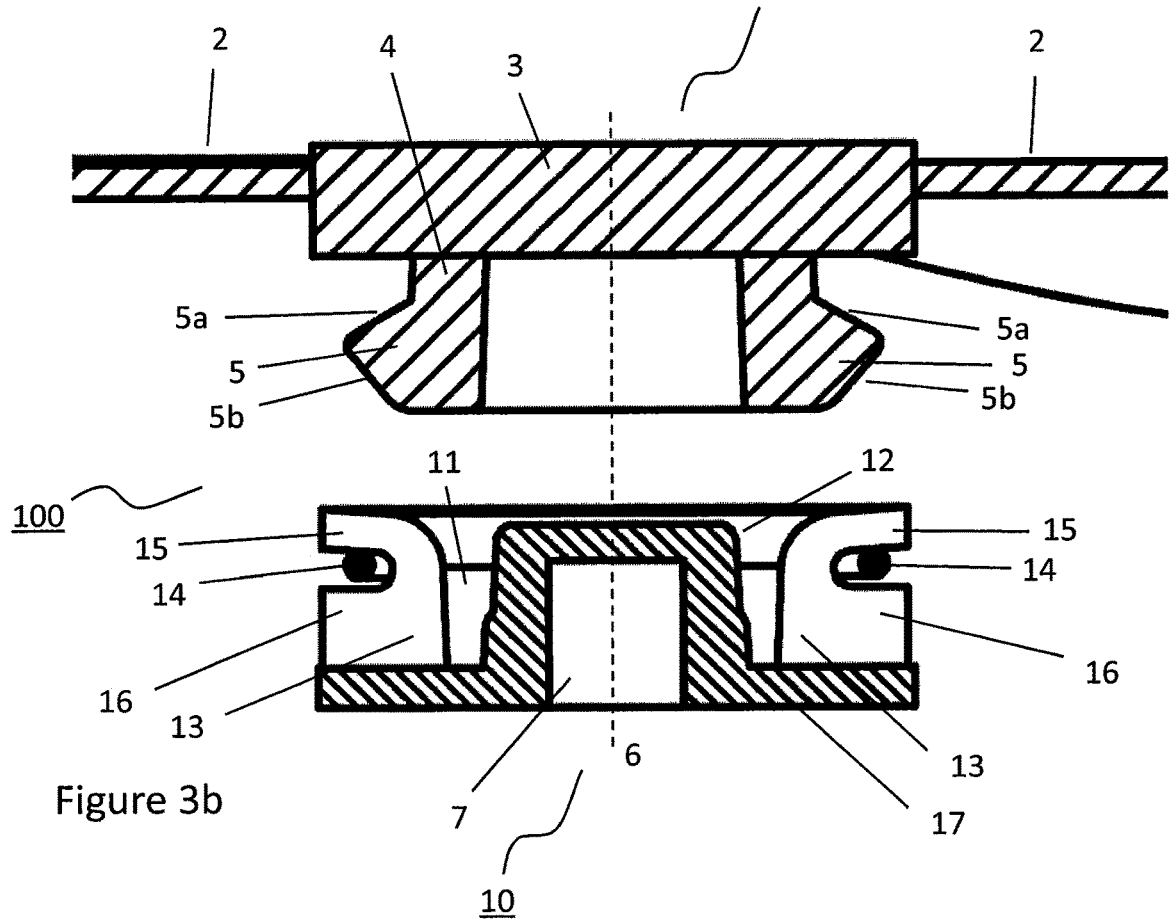
FIG. 3b illustrates an exploded view of the rotor attachment assembly 100 in cross section view.

As may be seen in FIGS. 3a and 3b, the fins 5 are provided with an upper edge 5a, a lower edge 5b, and may be designed with a desired width, matching the width of a respective cut-out 13 of the connecting assembly 10. The upper edge 5a may be provided with an angle relative to a rotor shaft axis 6. Similarly, the lower edge 5b may be provided with an angle relative to the rotor shaft axis 6, to ease the connection of the rotor assembly 1 to the connecting assembly 10, as described herein. Further, all transitions between edges of the connecting part 4 may be provided with a slightly rounded edges or chamfers to ease the connection and disassembly of the rotor assembly 1 to the connecting assembly 10.

The connecting assembly 10 of the presented embodiment is illustrated at least in FIGS. 1b, 2b and 3. The base 17 is here only shown as an illustrative example, and may instead comprise a form allowing the connecting assembly 10 to be attached directly to a motor, a rotor shaft, and/or to be an integral part of additional arrangements providing capabilities to the rotor, such as a swash plate system for controlling blade pitch, for example, or a torque controlled cyclic pitch system. In various embodiments, the connecting assembly 10 may include a socket 11 having walls extending up from a base 17 and being designed to accommodate, and corresponding to, the center section of the connecting part 4.

As shown, the center of the socket 11 may include a pin 12, corresponding to the shape and size of the hollow section 7 in connecting part 4. The upper end of the pin 12 may comprise a rounded edge, circumference, or chamfer, to ease the connection and disassembly of the rotor assembly 1. As may be seen in FIGS. 3a and 3b, the lower end of the pin 12 may comprise a larger cross section than the top. The width of the lower end of the pin 12 may be configured to carefully match the width of the hollow section 7, and may be formed so that the two parts are in contact when connected. The lack of gap between the lower end of the pin 12 and the hollow section 7 ensures that the rotor assembly 1 is positioned and centered correctly, however, the smaller cross section of the upper part of the pin 12 means that the rotor assembly 1 may be removed without complications, e.g. tilted at an angle during removal. Alternatively, the length of the pin 12 may be tapered, i.e. the bottom of the pin 12 may have a width carefully matching that of the hollow section 7, while the top has a slightly smaller diameter to ease connection. In various embodiments, the pin 12 may effectively center the rotor assembly 1 respective to the connecting assembly 10 about the rotor axis 6, thereby ensuring the correct properties of the rotor assembly 1 during operation.

As shown in at least FIG. 2*b*, the socket 11 may include a number of cut-outs or apertures 13 extending from the top of the socket 11 and at least partially down towards the base 17. The number of cut-outs 13 may preferably, but not necessarily, correspond to the number of fins 5 formed as part of connecting part 4 in the rotor assembly 1. The width and height of the cut-outs 13 are selected based on the width and height of the corresponding protruding fins 5. It should be appreciated that a slight difference in width between the fins 5 and the cut-outs 13 may be allowed for mechanical connection or coupling of the parts; however, it is desirable to minimize the difference, and thereby the gap, as much as possible. If the two parts are designed to include a gap when assembled, the walls of the fins 5 may move relative to the socket 11 as the rotor 1 starts to rotate. Further, the socket 11 may comprise or be made of a suitable metal, composite materials, or polymers as e.g. injection-molded plastic.

The cut-outs 13 are not necessarily all the same size relative to each other, but may be made of different sizes to differentiate between the cut-outs 13, respective of the fins 5. As known, most rotor assemblies operate solely in one rotational direction, and therefore most rotor assembly 1 are designed to be positioned in a specific orientation to provide certain capabilities. Providing the cut-outs 13 and fins 5 of different sizes may be used so that the rotor assembly 1 cannot be connected in the wrong position or relative orientation, thus ensuring their intended capabilities. For example, in a quadcopter based unmanned aerial vehicle, different cut out and/or fin sizes may be used to help differentiate between rotor assemblies configured to operate in a clockwise or counter-clockwise rotational direction.

As may be seen in FIGS. 1*b*, 2*b*, and 3, a spring 14 may be positioned on the outer side of the top of the socket 11, extending over the cut-outs 13. The upper exterior side of the socket 11 may therefore comprise a groove, brackets, and/or fins holding the spring 14 in place. Alternatively, as shown in the accompanying figures, the top of the socket 11 may comprise a flange 15, eliminating forces oriented upwards from moving or dislodging the spring 14 in an upward direction, and a bracket 16 may limit forces oriented down from moving or dislodging the spring 14 in a downward direction. One skilled in the art may recognize several forms or designs of the socket 11 that may achieve the same holding the spring 14 in place during operation. The top of the socket 11, in the accompanying figures illustrated as flange 15, may preferably be provided with a level form so that the rotor assembly 1 is positioned without an angle relative to the rotor shaft axis 6, perpendicular to the direction of thrust generated by the rotor assembly 1.

In general, the spring 14 is provided in a form matching the form of the socket 11 where it is to be positioned. As may be seen in FIG. 1*b*, the spring 14 may not be joined at the ends, i.e. in the example embodiment, not comprising a full circle, but may instead be provided with an opening or gap. Such opening allows for the spring 14 to expand as the rotor assembly 1 is connected and disconnected, as described herein. The spring 14 may preferably be made of metal, such as spring steel; however, it may also include or be formed from alternative materials such as composites or polymers. In various embodiments, the spring 14 may also be formed according to a predetermined tension. The tension of the spring 14 may be selected based on the two needs of holding the rotor assembly 1 in place during operation, and allowing for removal of the rotor assembly 1 without it becoming too difficult (e.g., manually, or through use of a removal tool). Further, the spring 14 may be positioned with a predefined distance to the bottom of the cut-out 13 so that the tension of the spring 14 pushes the protruding fins 5 of the rotor assembly 1 down into the cut-outs 13 when connected.

As may now be understood, providing the lower edge 5*b* at an angle makes connecting the rotor assembly 1 relatively reliable and feasible, allowing for the spring 14 to open in a predictable manner (e.g., with a predictable necessary applied force) as the rotor assembly 1 is connected. For example, a steeper angle of the lower edge 5*b* may make connection of the rotor assembly 1 easier. Referring to FIG. 3*b*, the lower edge 5*b* of the presented embodiment may be provided with an angle within the range of 15-65 degrees relative to the rotor shaft axis 6. More preferably, the lower edge 5*b* may be provided with an angle within the range of 30 to 50 degrees relative to the rotor shaft axis 6. Likewise, the upper edge 5*a* may be provided with an angle relative to the rotor shaft axis 6. The angle of the upper edge 5*a* should be flat enough so the spring 14 may exert the force necessary to hold the rotor assembly 1 in place, but not so flat that disassembly of the rotor assembly 1 becomes difficult or impossible. Referring to FIG. 3*a*, the upper edge 5*a* of the presented embodiment may be provided with an angle within the range of 20-70 degrees relative to the rotor shaft axis 6. More preferably, the upper edge 5*a* may be provided with an angle within the range of 50 to 70 degrees relative to the rotor shaft axis 6.

Referring now to FIGS. 3*a* and 3*b*, attachment of a rotor assembly 1 and use of the rotor attachment assembly 100 according to the example embodiment will now be explained. Preferably, when mounting the rotor assembly 1 to the connecting assembly 10, one of the protruding fins 5 may be positioned in the matching cut-out 13 of the socket 11, either on top of (e.g., above) the spring 14, or underneath (e.g., below) if possible. Thereby positioning the rotor 1 at an angle relative to the connecting assembly 10 and the aircraft. The upper end of the pin 12 centers the rotor assembly 1 to rotate about the rotor shaft axis 6 through the hollow section 7, ensuring that the rotor assembly 1 lines up with the remaining cut-outs 13. The remaining protruding fins 5 then rest on top of the spring 14 above their respective cut-outs 13. In accordance with providing the correct tension of the spring 14, a simple press (e.g., application of force) on the top of the rotor assembly 1 may thereby make the protruding fins 5 move over or underneath the spring 14 while the spring 14 opens up or extends to allow the fins 5 to pass. The form of the pin 12 is chosen to enable the rotor assembly 1 to move unhindered during this attachment, as described, but as the central part 3 moves to the lower parts of the pin 12, the matching widths of the pin 12 and the hollow section 7 centers the rotor assembly 1 with precision relative to the connecting assembly 10. At the same time, the top of the socket 11 centers the rotor assembly 1 so that thrust generated by the rotor assembly 1 is oriented perpendicular to the rotor shaft axis 6.

In various embodiments, disconnecting the rotor assembly 1 from the connecting assembly 10 (e.g., disassembling the rotor attachment assembly) may be simply a procedure of performing the opposite steps as previously described. Due to the tension of the spring 14, it is desirable that the rotor assembly 1 is tilted to achieve an angle, i.e. pulled at an angle relative to the connecting assembly 10, so that substantially one of the fins 5 open up or expand the spring 14 at its respective location. The smaller cross section at the upper part of the pin 12 allows for this movement, and after performing this step, the rotor assembly 1 may be disconnected from the connecting assembly 10, and may simply be removed. Alternatively, if the tension of the spring 14 is lowered, it may be possible to move both/all fins 5 over the spring 14 at the same time. The upper edge 5a may then be further adjusted to ensure that the tension of the spring 14 is oriented to retain the rotor assembly 1 in place while connected to account for the lower tension of the spring 14. If the tension of the spring 14 is lowered, it may also be possible to move all fins 5 over the spring 14 at the same time while disconnecting, such that disconnecting the rotor assembly 1 may be done by simply pulling the rotor assembly 1, or tilting the rotor assembly 1 sideways.

If the aircraft to which the rotor attachment assembly is coupled collides with an object, or if the rotor assembly 1 comes into contact with an object during operation, such collision or contact will in almost all cases introduce a force acting on the rotor assembly 1 at an angle (e.g., relative to the rotor axis 6. Consequently, this force will, through the assembly, result in a force pulling up on at least one of the protruding fins 5 distributed around the rotor assembly 1. If the force is strong enough, it will push the respective protruding fin 5 over the spring 14 that holds it in place, thereby disconnecting the rotor assembly 1 and, in many cases, minimizing the consequences of an associated impact.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A rotor attachment assembly for an aircraft, comprising:
    a connecting assembly associated with the aircraft; and
    a rotor assembly configured to be connected to the connecting assembly, wherein the rotor assembly comprises:
        a plurality of fins configured to fit a respective plurality of cut-outs of the connecting assembly,
        a hollow section configured to accommodate at least a part of a pin of the connecting assembly so as to center the rotor assembly relative to the connecting assembly, and
        a spring configured to expand to allow the fins to pass and to close to retain the fins when the rotor assembly is connected to the connecting assembly.

2. The rotor attachment assembly of claim 1, wherein at least one of the plurality of fins comprises a width different from widths of remaining ones of the plurality of fins.

3. The rotor attachment assembly of claim 1, wherein widths of the plurality of fins correspond to widths of the respective plurality of cut-outs.

4. The rotor attachment assembly of claim 1, wherein the plurality of fins comprises first and second fins.

5. The rotor attachment assembly of claim 1, wherein the spring is made of metal.

6. The rotor attachment assembly of claim 1, wherein the rotor assembly is made of a polymer and/or a composite material.

7. The rotor attachment assembly of claim 1, wherein the connecting assembly is made of a polymer and/or a composite material.

8. The rotor attachment assembly of claim 1, wherein an upper edge of the plurality of fins is provided with an angle within a range of 20-70 degrees relative to a rotor shaft axis of the rotor attachment assembly, and a lower edge of the plurality of fins is provided with an angle within a range of 15-65 degrees relative to the rotor shaft axis.

9. The rotor attachment assembly of claim 1, wherein an upper edge of the plurality of fins is provided with an angle within a range of 50-70 degrees relative to a rotor shaft axis of the rotor attachment assembly, and a lower edge of the plurality of fins is provided with an angle within a range of 30-50 degrees relative to the rotor shaft axis.

10. The rotor attachment assembly of claim 1, wherein a lower section of the pin has a larger cross section than an upper section of the pin.

11. A method of assembling the rotor attachment assembly of claim 1, the method comprising:
    positioning at least one of the plurality of fins in a corresponding one of the respective plurality of cut-outs, on top of the spring or underneath the spring;
    positioning remaining ones of the plurality of fins in corresponding remaining ones of the respective plurality of cut-outs, on top of the spring; and
    applying force to a top of the rotor assembly to expand the spring and pass at least the remaining ones of the plurality of fins into the corresponding remaining ones of the respective plurality of cut-outs.

12. The method of claim 11, wherein at least one of the plurality of fins comprises a width different from widths of remaining ones of the plurality of fins.

13. The method of claim 11, wherein an upper edge of the plurality of fins is provided with an angle within a range of 20-70 degrees relative to a rotor shaft axis of the rotor attachment assembly, and a lower edge of the plurality of fins is provided with an angle within a range of 15-65 degrees relative to the rotor shaft axis.

14. A method of disassembling the rotor attachment assembly of claim 1, the method comprising:
    applying force to a the rotor assembly to tilt the rotor assembly relative to the connecting assembly and expand the spring at a location corresponding to at least one of the plurality of fins; and
    removing the rotor assembly from the connecting assembly by moving at least remaining ones of the plurality of fins out of corresponding ones of the respective plurality of cut-outs past the expanded spring.

15. The method of claim 14, wherein at least one of the plurality of fins comprises a width different from widths of remaining ones of the plurality of fins.

16. The method of claim 14, wherein an upper edge of the plurality of fins is provided with an angle within a range of 20-70 degrees relative to a rotor shaft axis of the rotor attachment assembly, and a lower edge of the plurality of fins is provided with an angle within a range of 15-65 degrees relative to the rotor shaft axis.

17. A method of operating the rotor attachment assembly of claim 1, the method comprising:
   contacting an object with the rotor assembly or the aircraft while the aircraft is operating, wherein the contacting the object generates a force that acts to tilt the rotor assembly relative to the connecting assembly and expand the spring at a location corresponding to at least one of the plurality of fins; and
   selectively allowing the rotor assembly to disconnect from the connecting assembly, based on a pre-selected tension of the spring, by allowing the force to expand the spring sufficiently to pass at least remaining ones of the plurality of fins out of corresponding ones of the respective plurality of cut-outs.

18. The method of claim 17, wherein at least one of the plurality of fins comprises a width different from widths of remaining ones of the plurality of fins.

19. The method of claim 17, wherein an upper edge of the plurality of fins is provided with an angle within a range of 20-70 degrees relative to a rotor shaft axis of the rotor attachment assembly, and a lower edge of the plurality of fins is provided with an angle within a range of 15-65 degrees relative to the rotor shaft axis.

20. The method of claim 17, wherein:
   the plurality of fins comprises first and second fins;
   the spring is made of metal;
   the rotor assembly is made of a polymer and/or a composite material; and
   the connecting assembly is made of a polymer and/or a composite material.

\* \* \* \* \*